United States Patent
Dauguet et al.

(10) Patent No.: US 7,743,091 B2
(45) Date of Patent: Jun. 22, 2010

(54) CONTEXT MANAGEMENT SYSTEM FOR A NETWORK INCLUDING A HETEROGENOUS SET OF TERMINALS

(75) Inventors: Anthony Dauguet, Saint-Pierre du Fresne (FR); Anh Vo Viet, Verrieres-le-Buisson (FR); Hervé Le Corre, Eterville (FR); Christophe Beziau, Caen (FR)

(73) Assignee: France Telecom, Paris (FR)

( * ) Notice: Subject to any disclaimer, the term of this patent is extended or adjusted under 35 U.S.C. 154(b) by 1060 days.

(21) Appl. No.: 10/557,080

(22) PCT Filed: May 19, 2004

(86) PCT No.: PCT/FR2004/001229
§ 371 (c)(1),
(2), (4) Date: Nov. 17, 2005

(87) PCT Pub. No.: WO2004/107705
PCT Pub. Date: Dec. 9, 2004

(65) Prior Publication Data
US 2007/0067423 A1    Mar. 22, 2007

(30) Foreign Application Priority Data
May 22, 2003    (FR)    .................................... 03 06167

(51) Int. Cl.
G06F 15/16    (2006.01)
G06F 15/173    (2006.01)
G06F 15/177    (2006.01)

(52) U.S. Cl. ........................ 709/203; 709/223; 709/228; 709/238; 701/209

(58) Field of Classification Search ......... 709/200–203, 709/217–228, 238; 701/209
See application file for complete search history.

(56) References Cited

U.S. PATENT DOCUMENTS

| | | | |
|---|---|---|---|
| 6,035,339 A | 3/2000 | Ahraharam et al. | |
| 2003/0069027 A1* | 4/2003 | Heinonen et al. | 455/456 |
| 2004/0043758 A1* | 3/2004 | Sorvari et al. | 455/414.1 |
| 2004/0254724 A1* | 12/2004 | Mattila | 701/209 |
| 2005/0050437 A1* | 3/2005 | Giraud et al. | 715/500 |
| 2005/0060118 A1* | 3/2005 | Pavel et al. | 702/150 |
| 2007/0067423 A1* | 3/2007 | Dauguet et al. | 709/223 |

FOREIGN PATENT DOCUMENTS

| | | | |
|---|---|---|---|
| EP | 1 063 821 A | 12/2000 | |
| FR | 2 818 848 A | 6/2002 | |

* cited by examiner

Primary Examiner—Haresh N Patel
(74) Attorney, Agent, or Firm—Cohen Pontani Lieberman & Pavane LLP

(57) ABSTRACT

A context management system offering a user (160) the most appropriate context for processing information comprises a heterogeneous set (120) of terminals interconnected by a local information transmission network (110) and including a master terminal (108), a server computer (102) comprising processing means (130) for determining the most appropriate context for information processing by said heterogeneous set (120) of terminals, and an external information transmission network (104) connecting the server (102) at least to the master terminal (108). The server (102) further comprises a converter module (140) for sending the master terminal (108) an application (142) enabling the user (160) to download said most appropriate context to the master terminal (108).

12 Claims, 3 Drawing Sheets

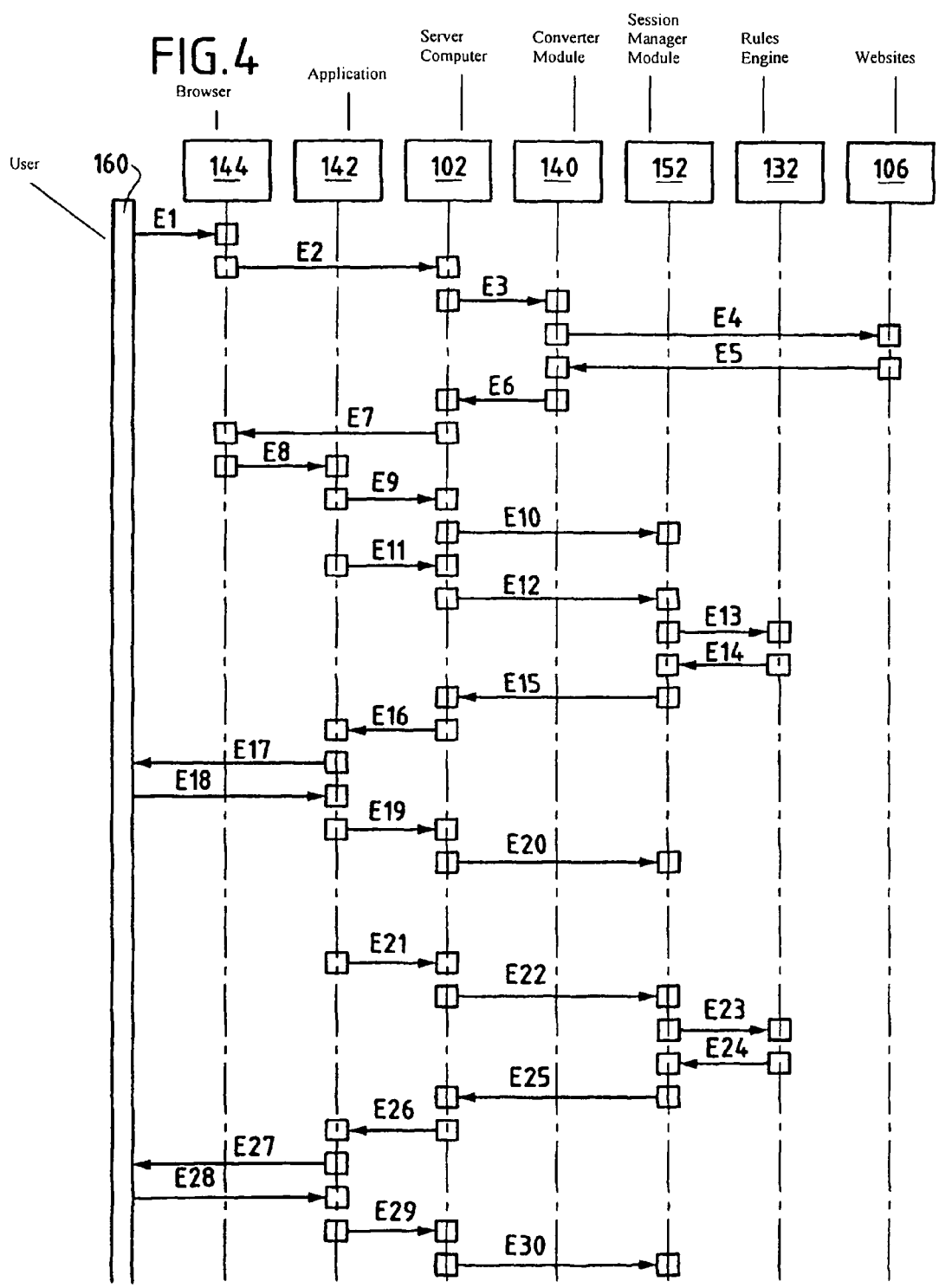

US 7,743,091 B2

CONTEXT MANAGEMENT SYSTEM FOR A NETWORK INCLUDING A HETEROGENOUS SET OF TERMINALS

RELATED APPLICATIONS

This is a U.S. National Phase Application under 35 USC 371 of International Application PCT/FR2004/001229, filed on 19 May 2004.

BACKGROUND OF THE INVENTION

The invention relates to a context management system and method for a user of a local information transmission network, more particularly a local network including a heterogeneous set of interconnected terminals. In the present context, the expression "local network" means not only a local area network (LAN) but also a personal area network (PAN) or a wireless personal area network (WPAN).

When a terminal of a heterogeneous set of terminals interconnected by a local network sends an enquiry (request for information) to a website, it receives in return information corresponding to its enquiry. This is known in the art. This information may include data in various forms, for example text, pictures or sound.

The terminal may have limited information processing capacity and is not necessarily capable of using the various forms of data sent to it in response to an enquiry that it sent.

To solve these problems, French Patent Application FR 2 818 848 in the name of the present Applicant proposes an information management system capable of managing information sent or received by a local network including a heterogeneous set of terminals taking account of the differing processing capacities of the terminals of the network.

FIG. 5 shows a system of the above kind, which includes a server 2 connected to an external information transmission network 4. The server therefore has access to websites 6 via the external network 4.

The server 2 is accessible through a master terminal 8 that is also connected to the network 4. This master terminal 8 is also connected to other terminals 12, 14, 16 and 18 in its vicinity by a local information transmission network 10. These terminals are provided with means for communicating with each other via the local network 10, for example communications means supporting Bluetooth communications technology. They therefore form a piconet 20 of terminals capable of exchanging information with each other by radio.

The master terminal 8 includes means 22 for determining the composition of the local network 10 in terms of terminals and their information-processing capacity. Thus the master terminal 8 includes means for defining the context, i.e. means for detecting or defining at a given time all the terminals liable to be able to provide a service in the user's environment.

The server 2 further includes processing means 24 for determining the most appropriate subset of terminals for processing information coming from the website 6 in response to an enquiry sent by the master terminal 8.

The server 2 also includes adapter means 28 for adapting the formats and quantities of the information to the information-processing capacity of each of the terminals. This information is then forwarded to the subset of terminals of the piconet 20 by routing means 26.

Accordingly, when using prior art techniques, it is necessary to provide a portion of the context management system in each terminal, or at least in the master terminal.

Given that the contexts are stored in the master terminal, the user changes context management system on changing master terminal.

Manual and sometimes repetitive action is necessary for the user to change context. If there are many changes of context in the same day, the user ends up no longer using this context management function, which ultimately makes this function of no utility.

OBJECT AND SUMMARY OF THE INVENTION

An object of the invention is to solve the above problems and to simplify and automate context management for users of a heterogeneous set of terminals by offering them the most appropriate choice of context at all times.

These objects are achieved by a context management system offering a user the most appropriate context for processing information, the system comprising:

a heterogeneous set of terminals interconnected by a local information transmission network and including a master terminal;

a server computer comprising processing means for determining the most appropriate context for information processing by said heterogeneous set of terminals; and an external information transmission network connecting the server at least to the master terminal;

which system is characterized in that the server further comprises a converter module for sending the master terminal an application enabling the user to download said most appropriate context to the master terminal.

Accordingly, the user can download the most appropriate context without it being necessary to provide a portion of the system in the master terminal.

The application sent to the master terminal is advantageously able to detect the terminal or terminals in said heterogeneous set of terminals accessible by the master terminal.

The processing means determine the most appropriate context as a function of preprogrammed data and/or of events that they receive from the master terminal.

The processing means include a rules engine associated with a rules base and a contexts base, the rules engine scanning all the rules available in the rules base in association with the data in the contexts base and as a function of preprogrammed data and/or of events received from the master terminal, thereby determining the most appropriate context.

The events received from the master terminal include regular detection by said application of the terminal or terminals accessible by the master terminal.

According to a feature of the invention, the events received from the master terminal may include a geographical location of the master terminal.

According to another feature of the invention, the preprogrammed data may include change of context timetables.

The contexts base advantageously includes a list of contexts defining for each context the terminals liable to be accessible, the appropriate type of connection between the local network and the external network, and the manner of returning the information to the terminals as a function of their capacity.

The rules base may include a list of rules based on terminals accessible by the master terminal and/or change of context timetables and/or master terminal geographical locations.

In a particular embodiment of the invention the system may include a peripheral for reading/writing the rules engine and the rules base.

The system may further include a session management module having the function of system surveillance.

According to an aspect of the invention the local network is a radio transmission communications network.

According to another aspect of the invention the local network is an infrared transmission communications network.

According to a further aspect of the invention the local network is a cable network.

The heterogeneous set of terminals may include mobile and/or fixed terminals.

The external network includes a plurality of interconnected networks.

The external network includes an Internet Protocol network and a telephone network.

The invention also provides a context management method offering a user the most appropriate context for processing information, the method including a step of determining the most appropriate context for information processing by a heterogeneous set of terminals interconnected by a local information transmission network and including a master terminal, which method is characterized in that it includes an additional step of a server computer sending an application to the master terminal via an external information transmission network connecting the server computer at least to the master terminal to enable the user to download said most appropriate context to the master terminal.

The application detects the terminal or terminals in said heterogeneous set of terminals accessible by the master terminal.

The most appropriate context is determined by scanning rules available in a rules base in association with data available in a contexts base and as a function of events that the server computer receives from the master terminal and/or preprogrammed data.

BRIEF DESCRIPTION OF THE DRAWINGS

Other features and advantages of the invention will emerge from a reading of the description given below by way of illustrative and non-limiting example and with reference to the appended drawings, in which:

FIG. 4 is a diagram showing overall dynamics of the various steps of the process for exchanging information between the means or units shown in FIG. 3.

DETAILED DESCRIPTION OF EMBODIMENTS OF THE INVENTION

Figure 1:
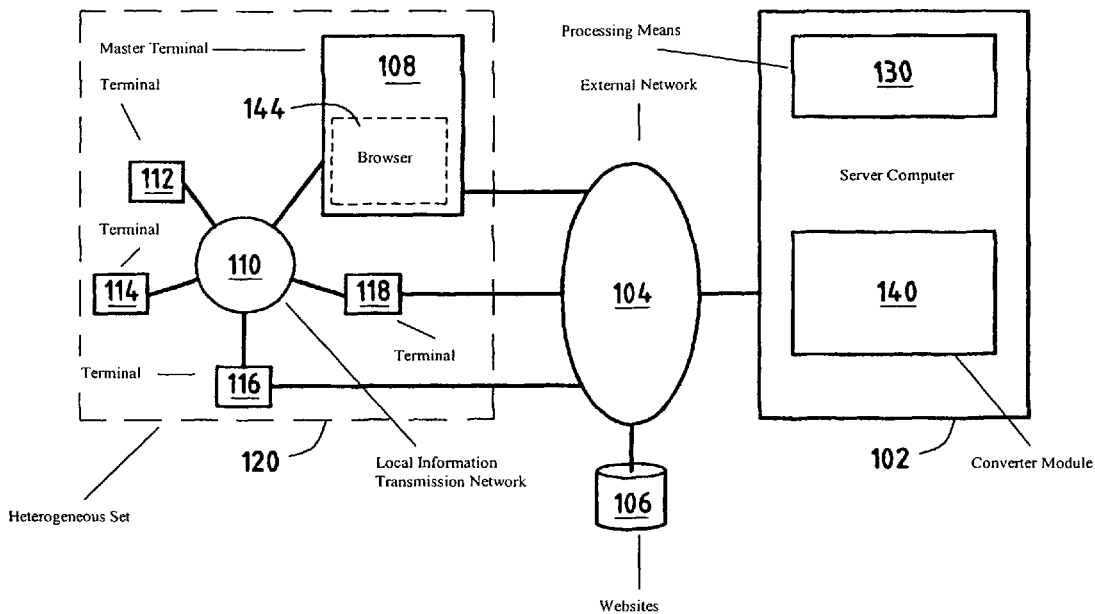
FIG. 1 is a diagram of a context management system of the invention.

FIG. 1 shows a context management system in accordance with the invention offering a user the most appropriate context for processing information.

The system includes a server computer 102 connected to an external information transmission network 104 and a heterogeneous set 120 of terminals 108, 112, 114, 116 and 118 interconnected by a local information transmission network 110. This heterogeneous set 120 of terminals includes a master terminal 108 provided with a browser 144.

The heterogeneous set 120 depends on the environment of the users of the terminals, which may include mobile and/or fixed terminals.

For example, in a working environment, the master terminal 108 could be a computer and the other terminals could be a microcomputer 112, earphones 114, a facsimile machine 116, and a personal digital assistant (PDA) 118.

In an automotive environment, the master terminal 108 could be a personal digital assistant (PDA) and the other terminals could be a car radio 112, loudspeakers 114, a mobile telephone 116, or other terminals 118, for example.

These terminals are provided with means for communicating with each other via the local network 110, thus forming a piconet of terminals capable of exchanging information via a radio, infrared, or cable connection.

In other words, the local network 110 may be a Bluetooth type radio communications network, an infrared transmission network, or a cable network.

The external information transmission network 104 connects the server computer 102 to at least the master terminal 108. In this example, the terminals 116 and 118 are also connected to the server computer 102 via the external network 104.

The server computer 102 has access to websites 106 via the external network 104. It is a "proxy" server mandated to submit an enquiry to the web in place of the master terminal 108.

The external network 104 may include a plurality of interconnected networks. For example, it may include an Internet Protocol network and a telephone network.

The server computer 102 comprises processing means 130 for determining the most appropriate context for the heterogeneous set of terminals to process information.

The server computer 102 also comprises a converter module 140 for sending an application to the master terminal 108 to enable the user to download the most appropriate context to the master terminal 108.

Figure 2:
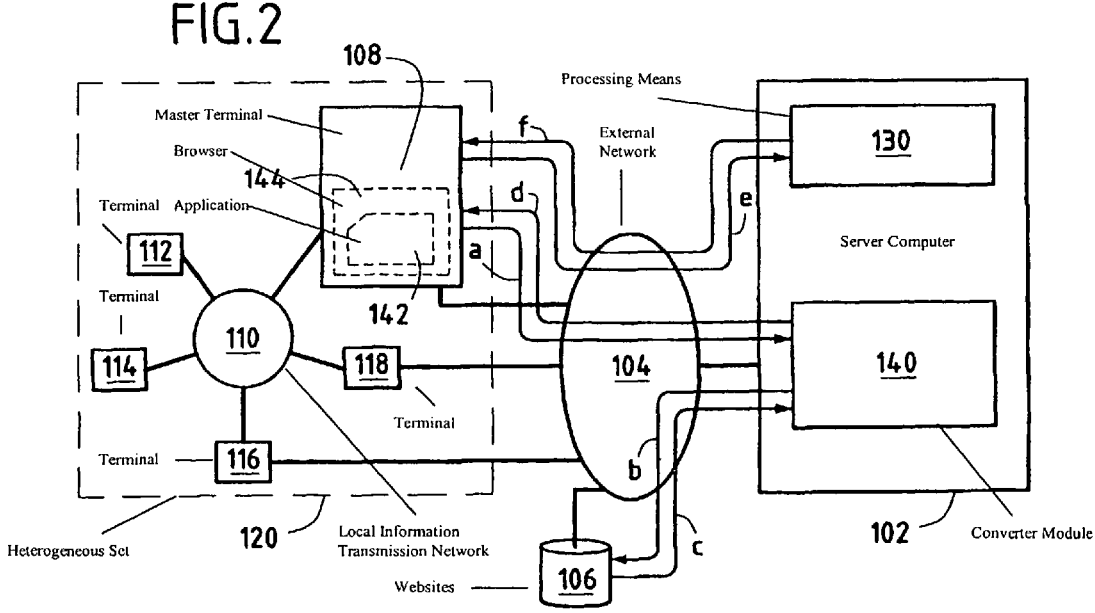
FIG. 2 is a diagram of a context management system showing a few steps of the process for exchanging information between the means or units shown in FIG. 1.

FIG. 2 shows the mechanism for sending this application to the master terminal 108.

When a user sends an enquiry (request for information) to a website from the master terminal 108, the browser 144 of that terminal 108 sends the request through the external network 104 to the converter module 140 of the server computer 102 (arrow a).

The converter module 140 forwards the enquiry unchanged to the website 106, which hosts the URL required by the user (arrow b).

The converter module 140 receives from the website 106 data that is a function of the enquiry (arrow c).

The converter module 140 then adds to this data an application 142 in the form of a message or banner including an "applet" program known in the art and forwards it to the browser of the master terminal. The application or applet is an interface including a menu and parameters for connecting to the processing means 130.

Execution of this application 142 by the browser 144 of the master terminal 108 enables the user to download the most appropriate context to the master terminal 108 from the processing means 130 of the server computer 102.

Executing the application 142 sends a message to the processing means 130 of the server computer 102 (arrow e). In return, the processing means 130 send a response (arrow f) including the most appropriate context to the application 142, which in turn displays this response to the user.

The processing means 130 determine the most appropriate context as a function of events that they receive from the master terminal 108 and/or preprogrammed data. Examples of the mechanism for determining the most appropriate context by the processing means 130 are described below.

The application 142 sent to the master terminal 108 is also used to detect which terminal or terminals from the heterogeneous set 120 of terminals are accessible to the master terminal 108.

Such applications or computer programs for automatically determining the composition in terms of accessible terminals are known in the art and are not described further here.

One advantage of sending the application to the master terminal 108 is that none of the terminals needs to have specific means for communicating with the server computer 102 in order to download the most appropriate context.

Figure 3:
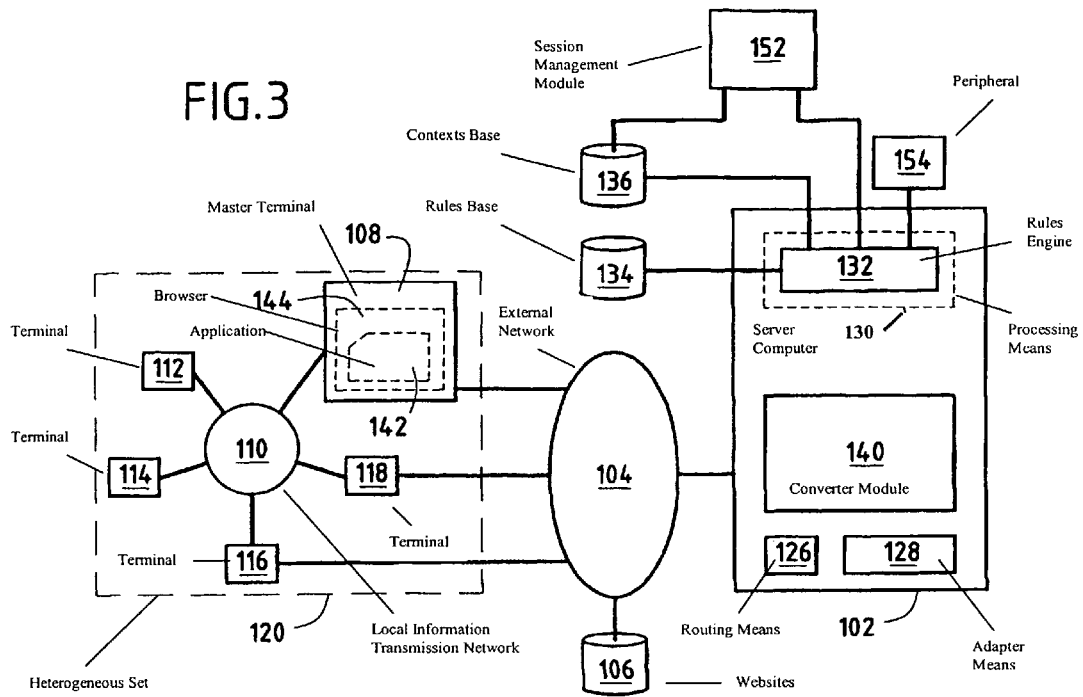
FIG. 3 is a diagram showing certain units from FIG. 1 in more detail.
Figure 5:
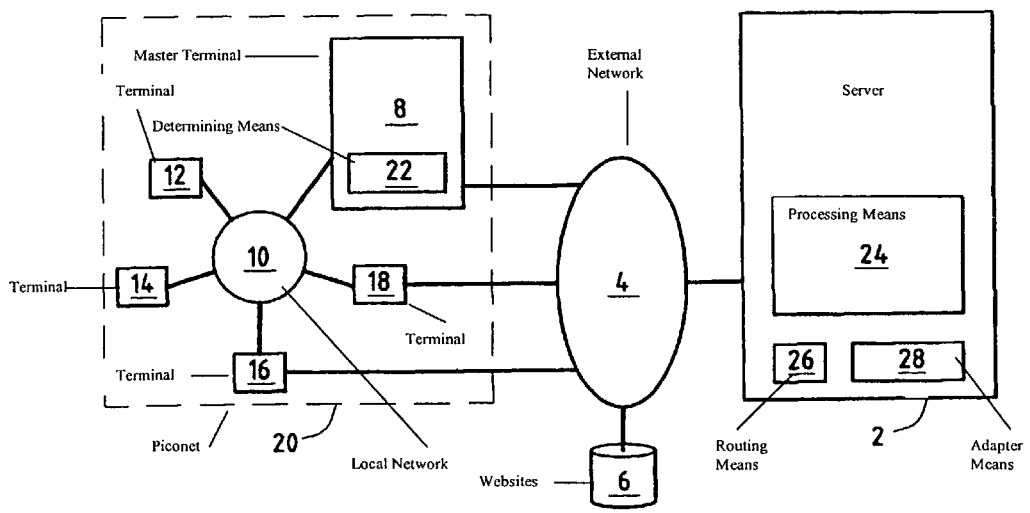
FIG. 5 is a diagram of a prior art information management system.

FIG. 3 shows the context management system, detailing the means for determining the most appropriate context.

The processing means 130 include a rules engine 132 associated with a rules base 134 and a contexts base 136.

Note that the rules base 134 and the contexts base 136 may form part of the server computer 102 or part of the external network 104. The rules engine 132 and the converter module 140 may belong to the same server computer 102 or to different server computers.

The contexts base 136 includes a list of contexts defining, for each context, the terminals liable to be accessible, the appropriate type of connection between the local network 110 and the external network 104, and the method of reproducing the information on the terminals as a function of their capacity.

For example, the contexts base 136 includes an "office" context, a "car" context, a "home" context, and a "roaming" context.

For the office context, the accessible terminals are a computer and a facsimile machine, for example, the type of connection or gateway is an Ethernet terminal, and all of the information is reproduced by the computer, for example.

For the car context, the accessible terminals are a car radio, a PDA, and a GSM mobile telephone, for example, the type of connection is the GSM gateway, and the reproduction of the information is shared between the various terminals so that sound is reproduced by the car radio, and everything else is reproduced on the PDA.

For the home context, the accessible terminal is a computer having an ADSL connection, for example, the type of connection is ADSL, and all of the information is reproduced by the computer.

For the roaming context, the accessible terminals are an earpiece, a PDA, and a GSM mobile telephone, for example, the type of connection is the GSM gateway, and the reproduction of the information is shared between the various terminals so that sound is reproduced by the earpiece, and everything else (pictures, text, video) is reproduced on the PDA.

The rules base 134 includes a list of rules based on the terminals accessible to the master terminal and/or change of context timetables and/or master terminal geographical locations. The data of these rules is structured in an extensible metalanguage of the XML type, for example.

The following are a few non-exhaustive examples of these rules:

If the available or accessible terminals or peripherals comprise a computer and an Ethernet terminal or the time band is from 9 h to 18 h, then the most appropriate context is the office context.

If the accessible terminal is a car radio, then the most appropriate context is the car context.

If the accessible terminals or peripherals comprise a computer and an ADSL terminal and the time band is not from 9 h to 18 h, then the most appropriate context is the home context.

Thus the rules engine 132 determines the most appropriate context by scanning all the rules available in the rules base 134 in association with the data in the contexts base 136 and as a function of events that it receives from the master terminal 108 or/and preprogrammed data.

The events that the rules engine 132 receives from the master terminal 108 may include the subset of accessible terminals that are detected regularly by the application 142 sent to the master terminal 108 by the converter module 140.

The events that the rules engine 132 receives from the master terminal 108 may include the geographical location of the master terminal 108, so that the most appropriate context is determined according to that location.

The most appropriate context may be determined as a function of preprogrammed data including change of context timetables, for example. This data may be configured by the user.

If the user is in the office, for example, the context management system prompts the user to switch to the "office" context; if the user is in a car the system prompts the user to switch to the "car" context; if the user is at home the system prompts the user to switch to the "home" context.

FIG. 3 shows that the context management system may also include a session management module 152 and a peripheral 154 connected to the rules engine.

The session management module 152 may be part of the server 102 or part of another server computer and its function is system surveillance.

It tells a telecommunications service operator the composition of the heterogeneous set 120 of terminals accessible to the user at any time. This module may also be used for billing telecommunications services.

The peripheral 154 is for reading/writing the rules engine and the rules base. Generally speaking, it constitutes means for reading/writing the rules engine 132 and the rules base 134 not belonging to the heterogeneous set 120 of terminals. For example, it is a desktop computer that the user employs to modify the rules or telecommunications service operator equipment that provides users with predefined rules.

The server computer 102 also includes adapter means 128 for adapting the formats and quantities of information coming from the web 106 to the information processing capacity of each terminal and routing means 126 for directing this information to the accessible terminals in the manner defined by the most appropriate context. This is known in the art.

FIG. 4 is a diagram showing an overall kinetic of one example of a context management method offering a user 160 the most appropriate context.

The steps are executed from top to bottom. In the step E1, the user 160 requests access to an Internet resource by clicking on a link or by entering the address or the URL, i.e. the format and the access path to a resource of the website that the user wishes to view in the browser 144.

In the step E2, the URL entered by the user is translated by the browser 144 into an enquiry conforming to the protocol corresponding to the URL (for example http) corresponding to the URL and forwards it to the server computer 102. The browser 144 is configured to send all enquiries systematically to the server 102 that submits the enquiry to the Internet or website instead of the browser 144 of the master terminal 108.

In the step E3, the server computer 102 forwards this enquiry unchanged to the converter module 140.

In the next step E4, no modification is made and the converter module 140 forwards the enquiry to the website 106 that hosts the URL required by the user 160.

In the step E5, as a function of the enquiry, the converter module 140 receives from the website 106 multimedia information corresponding to the enquiry, for example in the form of a graphical page or an HTML "web page".

During the step E6, the converter module 140 adds to this information an application 142 in the form of a message or banner including a program that provides access to the most appropriate context and forwards everything to the server computer 102.

During the step E7, the server computer 102 sends the web page and the application 142 for accessing the most appropriate context to the browser 144 of the master terminal 108 in the format appropriate to that terminal.

On receiving this page, the browser 144 displays it and executes the application code (step E8). In other words, the browser creates the instance for a session opening that follows the same path as the enquiry.

In the step E9, the application 142 sends a session opening message to the server computer 102.

In the step E10, the server computer 102 forwards this message to the session manager module 152.

In the step E11, the application detects the accessible terminals and sends a list of them to the server computer 102.

In the step E12, the server computer 102 forwards this list to the session manager module 152 for updating the session.

In the step E13, the session management module 152 sends the rule engine 132 the list of accessible terminals, the current time, location information or, generally speaking, anything that might be used in determining a context.

In the step E14, the rules engine 132 scans the rules base 134 until it finds the corresponding rule and sends the response to the session management module 152.

In the step E15, the session management manager 152 forwards the response to the server computer 102.

In the step E16, the server computer 102 forwards the response to the application 142.

In the step E17, the application displays a message informing the user of the most appropriate context.

In the step E18, the user accepts or refuses the proposed context. If the user refuses the system retains the preceding context, and if the user accepts, the new context is considered to be the current context.

In the step E19, the user's response is sent to the server computer 102.

In the step E20, the server computer 102 forwards this response to the session management module 152 for updating the session.

The subsequent steps correspond to the detection of a new terminal with the aim of proposing a new context. These steps may be replaced by a change of location indication or a change of time band.

In the step E21, the application has detected a new terminal accessible by the user 160, for example, and sends this information to the server computer 102.

In the step E22, the server computer 102 forwards this information to the session management module 152 for updating the session.

In the step E23, the session management module 152 forwards the information on the new accessible terminal to the rules engine 132.

In the step E24, the rules engine 132 scans the rules base 134 until it finds a corresponding rule and sends the response to the session management module 152.

In the step E25, the session management module 152 forwards the response to the server computer 102.

In the step E26, the server computer 102 forwards the response to the application 142.

In the step E27, the application displays a message informing the user of a new most appropriate context.

In the step E28, the user accepts or refuses the proposed context.

In the step E29, the user's response is sent to the server computer 102.

In the step E30, the server computer 102 forwards this response to the session management module 152 for updating the session.

The invention claimed is:

1. A context management system offering a user a most appropriate context for processing information, the system comprising:
   a heterogeneous set of terminals interconnected by a local information transmission network and including a master terminal;
   a server computer comprising:
      rules engine with 1) a rules base including a list of rules based on terminals accessible by the master terminal and master terminal geographical locations, and 2) a context base including a list of contexts defining the terminals available for each said list of contexts, a type of connection between a local network and an external network, and a manner of returning the information to the terminals as a function of a capacity of the terminals; and
      processing means for determining the most appropriate context for information processing by said heterogeneous set of terminals, wherein said most appropriate context defines a terminal or terminals of the heterogeneous set of terminals which are available for said master terminal at a given time and which are most appropriate for information processing; and
      an external information transmission network connecting the server to the master terminal, wherein the server further comprises a converter module for sending to the master terminal an application enabling the user to download said most appropriate context to the master terminal;
      the master terminal downloading the most appropriate context without providing context information from the master terminal.

2. A context management system according to claim 1, wherein the application sent to the master terminal is operable for detecting the terminal or terminals in said heterogeneous set of terminals accessible by the master terminal.

3. A context management system according to claim 1, wherein the processing means determine the most appropriate context as a function of at least one of preprogrammed data and events that the processing means receive from the master terminal.

4. A context management system according to claim 1, wherein the processing means include a rules engine associated with a rules base and a contexts base, the rules engine scanning all the rules available in the rules base in association with the data in the contexts base and as a function of at least one of preprogrammed data and events received from the master terminal to determine the most appropriate context.

5. A context management system according to claim 1, wherein the events received from the master terminal include regular detection by said application of at least one of the terminals accessible by the master terminal and the geographical location of the master terminal.

6. A context management system according to claim 4, wherein the contexts base includes a list of contexts defining for each context the terminals liable to be accessible, the appropriate type of connection between the local network and the external network, and the manner of returning the information to the terminals as a function of the capacity of the terminals, the rules base including at least one of a list of rules based on terminals accessible by the master terminal and at least one of change of context timetables and master terminal geographical locations.

7. A context management method offering a user a most appropriate context for processing information, the method comprising:
   determining, by a processing means of a server computer of a context management system, the most appropriate context for information processing by a heterogeneous set of terminals interconnected by a local information transmission network and including a master terminal, wherein said most appropriate context defines a terminal or terminals of the heterogeneous set of terminals which are available for said master terminal at a given time and which are most appropriate for information processing;
   sending, by the server computer, an application to the master terminal via an external information transmission network connecting the server computer to the master terminal to enable the user to download said most appropriate context to the master terminal;
   the server comprises:
      rules engine with 1) a rules base including a list of rules based on terminals accessible by the master terminal and master terminal geographical locations, and 2) a context base including a list of contexts defining the terminals available for each said list of contexts, a type of connection between a local network and an external network, and a manner of returning the information to the terminals as a function of a capacity of the terminals; and
      a converter module for sending to the master terminal an application enabling the user to download said most appropriate context to the master terminal; and
   downloading, by the master terminal, the most appropriate context without providing context information from the master terminal.

8. A context management method according to claim 7, wherein the application detects the terminal or terminals accessible by the master terminal from said heterogeneous set of terminals.

9. A context management method according to claim 7, wherein the most appropriate context is determined by scanning rules available in a rules base in association with data available in a contexts base and as a function of at least one of events that the server computer receives from the master terminal and preprogrammed data.

10. A converter module in the context management system according to claim 1.

11. A server computer in the context management system according to claim 1.

12. A non-transitory computer-readable storage medium storing a program comprising code instructions which when executed in the server computer perform the context management method steps according to claim 1.

* * * * *